United States Patent [19]

Bubik

[11] Patent Number: 5,213,466
[45] Date of Patent: May 25, 1993

[54] MULTIFUNCTION LOADING AND RECOVERY APPARATUS

[75] Inventor: Leslie Bubik, Toronto, Canada

[73] Assignee: Vulcan International, Inc., Jackson, Miss.

[21] Appl. No.: 853,873

[22] Filed: Mar. 18, 1992

Related U.S. Application Data

[63] Continuation of Ser. No. 632,118, Dec. 20, 1990, abandoned, which is a continuation of Ser. No. 329,553, Mar. 28, 1989, abandoned.

[51] Int. Cl.$^5$ .............................................. B60P 1/28
[52] U.S. Cl. .................................. 414/494; 414/498; 414/546; 414/559
[58] Field of Search ............... 414/491, 494, 498, 499, 414/500, 538, 546, 555, 559, 563, 571

[56] References Cited

U.S. PATENT DOCUMENTS

| | | | |
|---|---|---|---|
| 2,550,230 | 4/1951 | Dalton | 414/494 |
| 2,745,566 | 5/1956 | Bouffard . | |
| 3,082,892 | 3/1963 | Cox | 414/494 X |
| 3,819,075 | 6/1974 | Derain | 414/498 X |
| 3,878,948 | 4/1975 | Corompt . | |
| 3,892,323 | 7/1975 | Corompt | 414/498 X |
| 3,944,095 | 3/1976 | Brown | 414/494 X |
| 3,957,166 | 5/1976 | Durham | 414/500 X |
| 3,964,625 | 6/1976 | Wirz | 414/498 X |
| 4,130,211 | 12/1978 | Abascal | 414/500 X |
| 4,175,904 | 11/1979 | Airaksinen | 414/498 X |
| 4,212,580 | 7/1980 | Fluck | 414/538 X |
| 4,319,862 | 3/1982 | Cook | 414/494 X |
| 4,755,097 | 7/1988 | Corompt | 414/499 |
| 4,770,592 | 9/1988 | Winter | 414/494 X |
| 5,007,792 | 4/1991 | Wiedeck et al. | 414/494 X |

FOREIGN PATENT DOCUMENTS

| | | | |
|---|---|---|---|
| 0087417 | 8/1978 | Japan | 414/491 |
| 0180334 | 10/1983 | Japan | 414/498 |
| 0081831 | 4/1986 | Japan | 414/559 |
| 2135658 | 9/1984 | United Kingdom | 414/498 |

Primary Examiner—Michael S. Huppert
Assistant Examiner—James Keenan
Attorney, Agent, or Firm—Niro, Scavone, Haller & Niro

[57] ABSTRACT

An improved multi-function loading and recovery apparatus for pallets, containers and the like having simple, effective design which enables efficient operation in a wide variety of recovery and loading operations.

1 Claim, 3 Drawing Sheets

MULTIFUNCTION LOADING AND RECOVERY APPARATUS

This application is a continuation of application Ser. No. 09/632,118, now abandoned which is a continuation of application Ser. No. 07/329,55, now abandoned.

BACKGROUND AND SUMMARY OF THE INVENTION

The present invention relates generally to a multifunction loading and recovery apparatus and more particularly to an improved loading and recovery apparatus of simple design and construction that is easy and efficient to operate in a wide variety of loading, unloading, dumping and recovery applications.

There are a variety of known pallet or container loading devices which have the ability to serve a dumping function. Typically, these devices are used to load, unload and dump containers for purposes such as waste removal, etc. However, these known devices suffer from a number of disadvantages because of their design and construction. Generally, the known devices have complicated gantry arm or boom assemblies necessary to achieve their designated functions. And because of their complicated gantry arm or boom assemblies, the known devices are often higher priced, require increased maintenance and are more difficult to operate.

One known device, for example, is the type disclosed in U.S. Pat. No. 3,892,323. This device functions as a container loading an unloading apparatus and also operates in a dump mode. It consists of an L-shaped gantry arm which is supported by the sub-frame of a vehicle. The gantry arm is activated by a hydraulic ram connected to the vehicle chassis and the gantry arm. The gantry arm is sectioned such that it pivots on an intermediate point along its length and is then pivotally connected at a second point to the vehicle chassis, typically behind the rear wheels of the vehicle. The gantry arm is also horizontally extendible through the use of a second hydraulic ram located within a sleeve of the gantry arm.

However, devices of this type have several disadvantages. First, because the gantry arm is sectioned and pivotable about two points, a more complicated mechanical configuration is required. This increases maintenance and material costs. Secondly, in certain modes of operation, e.g., dumping, the gantry arm pivots at a point behind the rear wheels of the vehicle. This necessitates the use of larger and higher pressure hydraulic cylinders for effective operation and also increases the tipping moment of the device, which decreases the amount of load which can be lifted before the front wheels of the vehicle lift off of the ground.

Other known devices suffer from these and other disadvantages and are disclosed in U.S. Pat. Nos. 3,819,075, 3,878,948 and 4,175,904. All of these devices have a gantry arm that pivots about two points which necessitates more complicated parts with decreased mechanical advantage.

BRIEF SUMMARY OF THE INVENTION

Therefore, an object of the present invention is to provide an improved multi-function loading and recovery apparatus.

Another object of the present invention is to provide an improved recovery apparatus that is simple in design and construction, yet effective in a wide variety of operating conditions.

A further object of the present invention is to provide a single section L-shaped gantry arm which pivots about a single point forward of the centerline of the rear wheels of the recovery vehicle.

An additional object of the present invention is to provide an improved recovery apparatus that may be operated from inside the cab of the recovery vehicle.

Still another object of the present invention is to provide an improved recovery apparatus having an A-frame pallet that also permits a recovery cable to travel through its base having a pulley assembly to provide for 0° pallet loading angles.

Still an additional object of the present invention is to provide a winching system mounted on the rear tailgate portion of the recovery vehicle to aid in loading and provide the ability to perform additional recovery functions.

Still a further object of the present invention is to provide an improved recovery apparatus that has a single pivot, extendible L-shaped gantry arm that also provides a dumping function.

Yet another object of the present invention is to provide a hold-down latch to secure the pallet, container or other load to the recovery vehicle.

Yet an additional object of the present invention is to provide an improved recovery apparatus that is simple, effective and inexpensive.

In accordance with the present invention, an improved multifunction loading and recovery apparatus is provided that preserve the beneficial features and advantages of the known devices while at the same time overcoming disadvantages and achieving additional advantages, such as simple construction, decreased maintenance and lower cost.

In the preferred embodiment of the present invention, an improved loading and recovery apparatus for loading and unloading containers is provided which is operable on the rear of a recovery vehicle having a chassis (frame), cab and front and rear wheels. The present invention includes a generally L-shaped gantry arm pivotally connected at a pivot end to a point generally forward of the centerline of the rear wheels of the recovery vehicle and extends forward on the vehicle to a free end which is disposed on a 90° angle therefrom. At least one lifting cylinder is also provided, one end of which is pivotally connected to a generally forward portion of the vehicle frame and the other end pivotally connected to a generally intermediate portion of the gantry arm. A hook is provided on the free end of the gantry arm for engagement with a handle on a container or pallet. A roller assembly is also provided on the rear of the recovery vehicle for guiding and supporting the container during loading, unloading and dumping.

In other embodiments of the present invention, a winch and cable assembly is provided on the rear of the recovery vehicle which aids in container or pallet loading and permits a variety of additional functions. And in other embodiments, a latch member is provided on the rear of the recovery vehicle to automatically secure the container to the chassis of the recovery vehicle when in a loaded position.

BRIEF DESCRIPTION OF THE DRAWINGS

These and other features, objects and advantages of the present invention will become apparent from the following description and drawings wherein like reference numerals represent like elements in the several views, and in which.

DETAILED DESCRIPTION OF THE PREFERRED EMBODIMENTS

Figure 1:
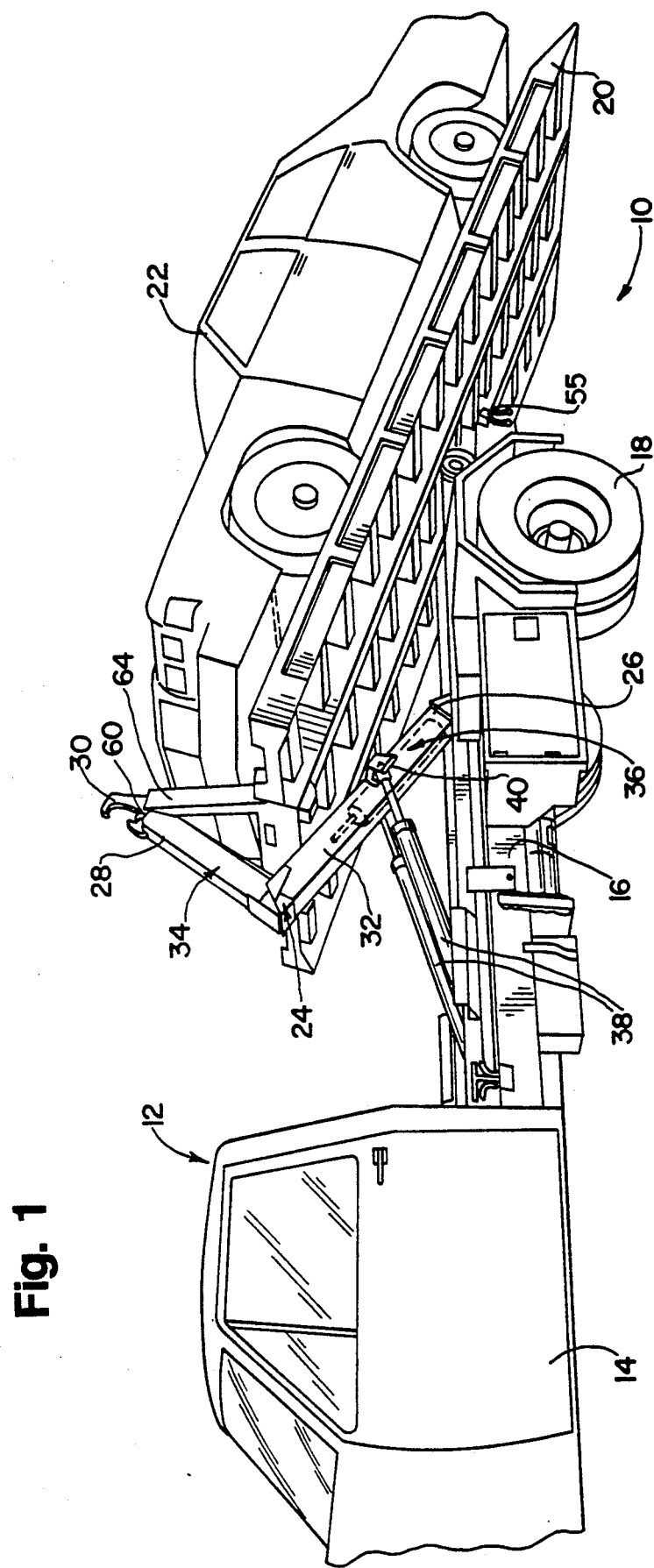
FIG. 1 is a side perspective view of the present invention shown in an intermediate loading or unloading position with a vehicle load on a pallet.

The multi-function loading and recovery apparatus of the present invention is shown generally as 10 in FIG. 1. The invention 10, consists of a recovery vehicle 12 having a cab 14 and a frame or chassis 16. The recovery vehicle 12 also has front wheels (not shown) and rear wheels 18. In FIG. 1, the loading and recovery apparatus 10 is shown with a pallet 20 and a load 22 in an intermediate loading/unloading position. Throughout the specification, reference is made to the front or forward, and rear or rearward positions. As used herein, front or forward refers to a direction toward the cab 14 of the recovery vehicle 12 and rear or rearward refers to a direction toward the rear wheels 18 of the recovery vehicle 12.

Figure 3:
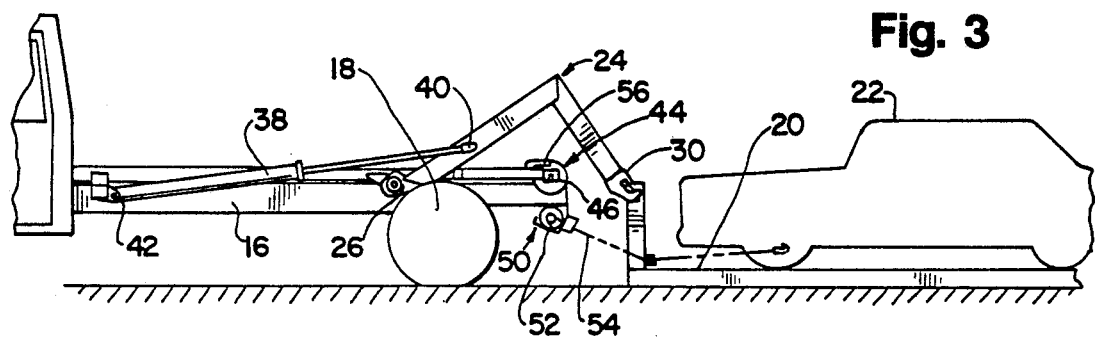
FIGS. 3-5 are side elevational views of the present invention in various stages of loading or unloading.
Figure 4:
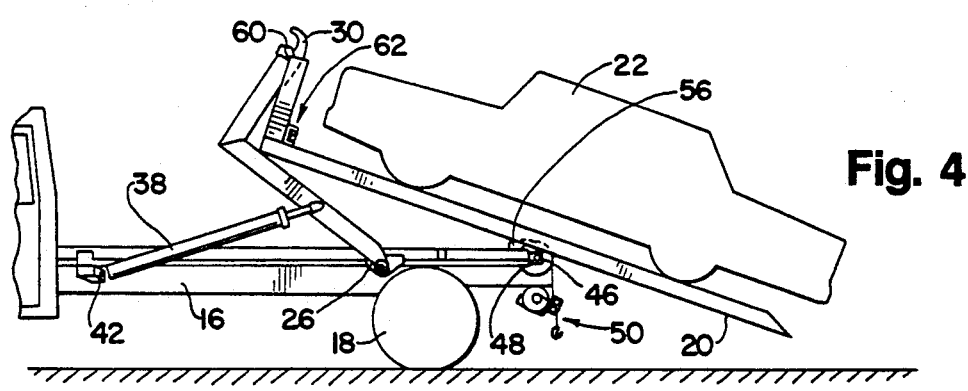
Figure 5:
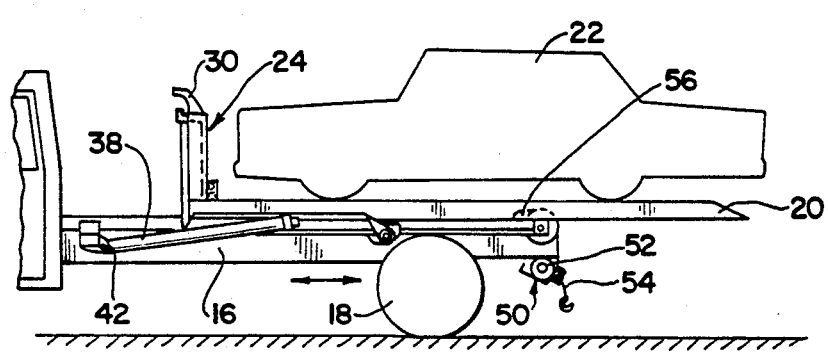
Figure 6:
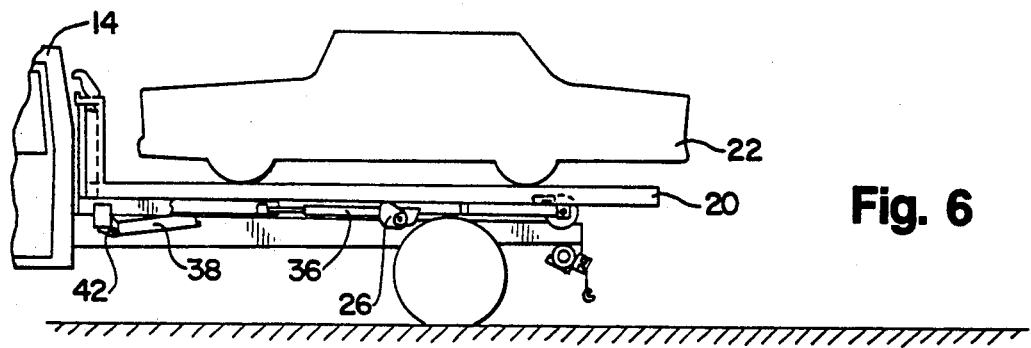
FIG. 6 is a side elevational view of the present invention in a fully loaded position.

The construction and operation of the present invention can best be seen in FIGS. 1-6. A generally L-shaped gantry arm 24 is provided having a pivot end 26 and a free end 28. Gantry arm 24 is generally horizontal and parallel to frame 16 when in a loaded or lowered position. Attached to free end 28 is a hook 30 or other means to grab and hold the pallet 20 as hereinafter described. The open side of hook 30 faces forward toward the cab 14 of the recovery vehicle 12 when the gantry arm 24 is in its lowered position (FIGS. 5-6).

Gantry arm 24 is composed of a logitudinal member 32 and a perpendicular member 34. Perpendicular member 34 is disposed 90° above longitudinal member 32 giving the gantry arm 24 its L-shape. Longitudinal member 32 also forms a sleeve (not shown) which houses a extension cylinder 36. Extension cylinder 36 is operably connected to a portion of longitudinal member 32 which mates with the sleeve, this portion then leading to perpendicular member 34. In this manner, the length of gantry arm 24 can be varied by activation of extension cylinder 36. This enables the effective loading and unloading functions with varied pallet 20 types, as well as permitting the dumping function as hereinafter described.

Gantry arm 24 is pivotally connected at pivot end 26 to the frame 16 of recovery vehicle 12 at a location generally forward of the centerline of rear wheels 18 in a manner well known to those of ordinary skill in the art. A pair of lifting cylinders 38 are pivotally connected at one end 40 to an intermediate location on main member 32 of gantry arm 24. Another end 42 of lifting cylinders 38 are pivotally connected to a generally forward portion of frame 16.

A roller assembly 44 is provided on the rear of frame 16. Roller assembly 44 consists Of a plurality of rollers 46 operably mounted on an axle 48 or other suitable means which is rigidly secured to the frame 16 of recovery vehicle 12. Roller assembly 44 is designed to support and smoothly guide pallet 20 in certain stages of loading, unloading and dumping as hereinafter described.

Also provided on recovery vehicle 12 is a winch and cable assembly 50 (partially shown in FIG. 1). The winch and cable assembly 50 is connected to the rear tailgate portion of recovery vehicle 12 and has a winch 52 and a cable 54 and controls 55. Winch and cable assembly 50 may be used to aid in loading the pallet 20 or may be used to enable other functions as hereinafter described.

Recovery vehicle 12 is also provided with a hold-down latch 56 which is generally rearward on chassis 16. Latch 56 is designed to cooperate with a hook or other member (not shown) on the generally rearward portion of pallet or container 20. Latch 56 automatically cooperates with the hook (not shown) on pallet 20 when in a fully loaded position to keep the pallet 20 or container stable and prevent bouncing (of the pallet 20 and load 22) when the recovery vehicle 12 travels.

The operation of the present invention 10 can best be seen by reference to FIGS. 2-6, showing the recovery of a disabled vehicle 22. When lifting cylinders 38 are extended, gantry arm 24 rotates about its pivot end 26 such that hook 30 faces generally rearward. From inside the cab 14, the operator aligns hook 30 with a handle 60 on the forward portion of pallet 20. At this phase, extension cylinder 36 is in a generally retracted position.

Figure 2:
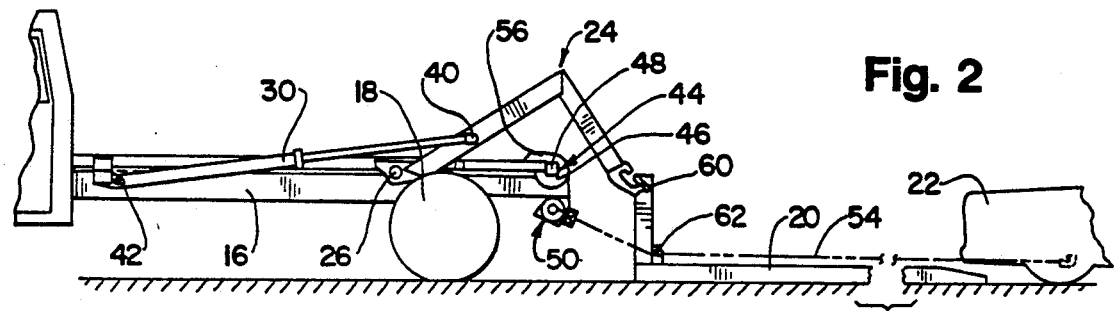
FIG. 2 is a side elevational view of the present invention shown in an initial stage of loading the pallet.

Cable 54, of cable and winch assembly 50 is guided through a set of pulleys or rollers 62 on the lower forward portion of pallet 20 and the cable 54 is attached to the disabled vehicle 22. As can be seen, cable and winch assembly 50, in conjunction with pulleys 62, provide a 0° loading angle for loading a disabled vehicle 22 onto pallet 20. Winch 52 is activated and vehicle 22 positioned upon pallet 20 (FIGS. 2 and 3). As also can be seen from FIGS. 2 and 3, during operation of winch and cable assembly 50, the handle 60 of pallet 20 is caused to further nest with hook 30.

With reference to FIG. 4, once the load 22 is secured to pallet 20, lifting cylinders 38 are retracted causing gantry arm 24 to rotate forward along with pallet 20. During this loading phase, pallet 20 contacts roller assembly 44. When the lifting cylinders 38 are fully retracted, the gantry arm 24 is generally parallel to chassis 16 as in FIG. 5. Retraction cylinder 36 is then extended forward until the pallet 20 and load 22 are properly positioned on frame 16. At this point, latch 56 is engaged with a hook (not shown) and the pallet 20 and the load 22 secured for travel (FIG. 6). This sequence is followed in reverse for the unloading operation.

In another embodiment of the present invention, pallet 20 is provided with an A-frame support structure 64 on its front end (See FIG. 1). Support structure 64 secures the handle 60, provides adequate strength for loading and unloading pallet 20 and also enables the handle 60 to properly nest in hook 30. The arrangement also enables the perpendicular member 34 of gantry arm 24 to operate with the pallet 20 during loading and unloading (See FIG. 4) and secures the pallet 20 fully forward with hook 30 when in a loaded position (see FIGS. 5 and 6).

Figure 7:
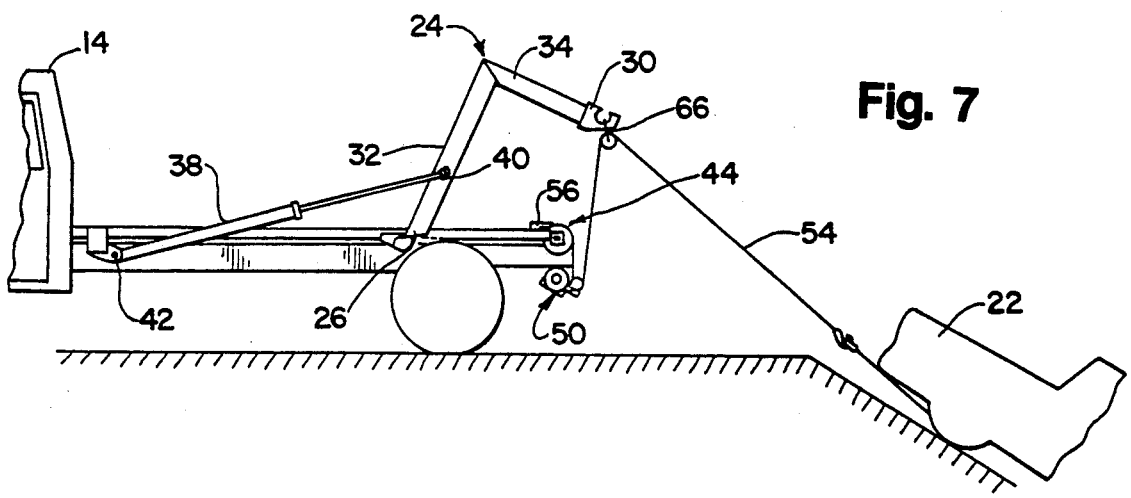
FIG. 7 is a side elevational view of the present invention showing a rear mounted winch and cable assembly and a hook used in a recovery mode.

Another embodiment of the present invention is shown in FIG. 7. In this embodiment, a sheave or snatch block assembly 66 is secured to hook 30 which has been rotated generally rearward. Cable 54 of cable and winch assembly 50 is then threaded through sheave 66, attached to vehicle 22 and operated to enable a variety of recovery functions. Hook 30 and winch and cable assembly 50 may also be used to secure and operate a standard towing sling or cradle-type wheel lift system for towing disabled vehicles without the use of a pallet 20 (not shown).

Figure 8:
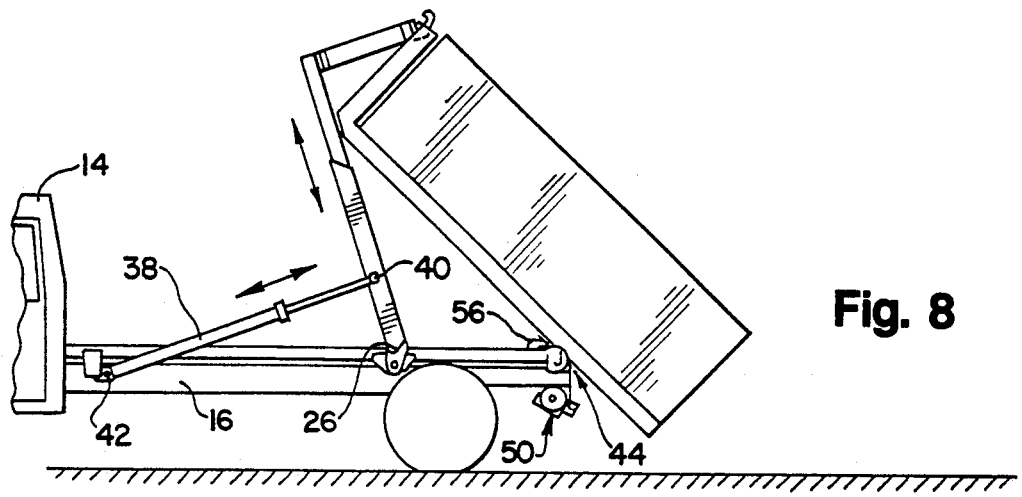
FIG. 8 is a side elevational view of the present invention shown with a container in a dumping mode of operation.

FIG. 8 shows the present invention in a dumping configuration. To be utilized for dumping, gantry arm 24 is rotated rearward and retraction cylinder 36 extended. By extending the retraction cylinder 36, the container 20 contacts roller assembly 44 and does not touch the ground, thus achieving the dumping function. The present invention is able to achieve the dumping function (and loading/unloading) without the necessity and complications of pivoting gantry arm 24 about two points. This provides better mechanical advantage for cylinder activation that enables the use of smaller cylinders which are operated at lower pressure. This results in lower device cost, easier operation and lower maintenance. The single pivot feature of the present invention eliminates the need for complicated parts, making operation faster and easier.

While preferred embodiments of the present invention have been illustrated and described, it will be understood by those of ordinary skill in the art that changes and modifications can be made without departing from the invention in its broader aspects. Various features of the present invention are set forth in the following claims.

What is claimed is:

1. An improved loading and recovery apparatus for loading and unloading a container, said apparatus being operable on the rear of a recovery vehicle having a chassis and front and rear wheels, comprising:

a generally L-shaped gantry arm having a free end and a pivot end, said gantry arm being pivotally connected to said chassis forward of said rear wheels and extending to a free end to create a single pivot L-arm arrangement; said gantry arm being extendible and retractable along a generally longitudinal axis of said chassis through employment of an extension cylinder;

at least one lifting cylinder having two ends, one end pivotally connected to a generally forward portion of the vehicle chassis and the other end pivotally connected to a generally intermediate portion of said gantry arm;

a hook on the free end of the gantry arm for engagement of said container;

a roller assembly located generally toward the rear of said vehicle for guiding and supporting said container during loading and unloading; and a winch and cable assembly mounted to the rearward portion of the chassis of the recovery vehicle below said roller assembly to create a substantially zero degree loading and unloading winching angle to assist loading and unloading of an object onto and off said container.

* * * * *